F. STREICH.
LOAF FORMING MACHINE.
APPLICATION FILED JUNE 30, 1910.
1,043,979.
Patented Nov. 12, 1912.
Fig. 2.
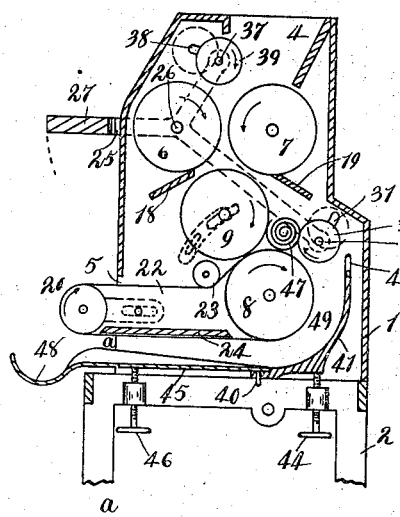
Fig. 1.
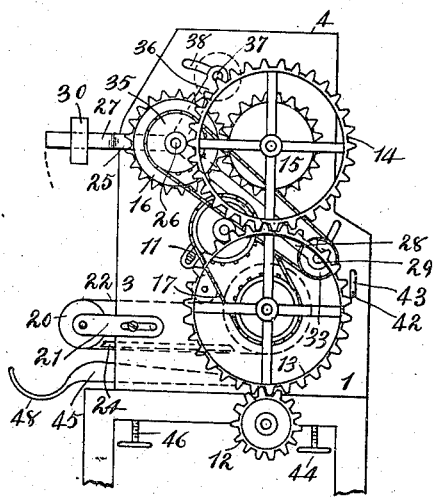
Fig. 3.
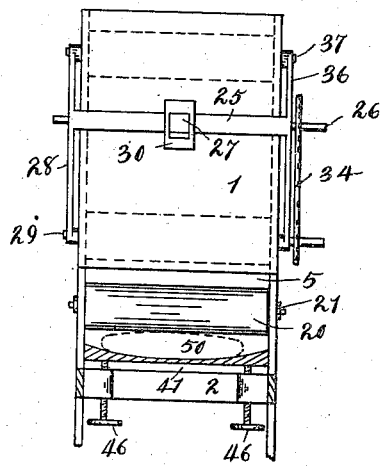
Fig. 4.
Fig. 5.
Fig. 6.
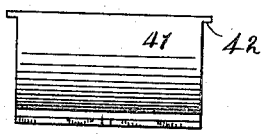
Witnesses
C. F. Bassett
C. B. Benjamin
Inventor
Frank Streich
By Frederick Benjamin
Attorney

UNITED STATES PATENT OFFICE.

FRANK STREICH, OF ST. LOUIS, MISSOURI.

LOAF-FORMING MACHINE.

1,043,979.  Specification of Letters Patent.  Patented Nov. 12, 1912.

Application filed June 30, 1910. Serial No. 569,635.

*To all whom it may concern:*

Be it known that I, FRANK STREICH, citizen of the United States, residing at St. Louis, State of Missouri, have invented certain new and useful Improvements in Loaf-Forming Machines, of which the following is a specification.

My invention relates to machines for forming loaves, and the chief objects of the improvements which constitute the subject matter of this application for patent are:—to provide a machine adapted to automatically form loaves of a desirable shape from dough previously divided into predetermined quantities; to furnish means for rolling each divided portion of dough into a sheet of predetermined thickness; to provide means for coiling the sheet thus formed into a roll; and to provide means for molding the roll so formed into the required shape.

Other objects of this invention are to supply removable and interchangeable mold boards; and to provide means for automatically conveying the formed rolls to a position where they will be subjected to the action of the mold board.

The desired objects are attained by employing the apparatus illustrated in the accompanying drawing in which the details of construction are shown in the following views:—

Figure 1 is a side elevation; Fig. 2 is a vertical median section; Fig. 3 is a front elevation with some of the parts removed, a portion being in section, the position of the cutting plane being on the line a—a of Fig. 2; Figs. 4 and 5 are a plan and side elevation respectively of an adjustable bearing for one of the rollers, and Fig. 6 is a front elevation of the curved loaf guide.

Referring to the details of the drawing, the numeral 1 indicates a casing supported on a base 2, provided with side walls 3 with the usual hopper 4 arranged above, and having an aperture 5 in the front wall. Arranged beneath the hopper are feed rollers 6, 7, and directly under the rear roller 7 is an apron roller 8, all of said rollers being journaled in the walls 3. Situated between the feed rollers and the said apron roller is a pressure roller 9, journaled in bearings 11 adjustably secured to the side walls. The rollers 8 and 7 are rotated in opposite directions from a pinion 12 by means of gears 13 and 14 respectively mounted on said rollers. The roller 6 is driven in a direction opposite to that given the roller 7 by gears 15, 16, mounted on the respective roller, while the roller 9 is rotated from the roller 8 and in the same direction by means of a chain 17 engaging sprockets on said rollers. The rollers are all rotated at the same peripheral speed. The feed rollers 6, 7, are furnished with the usual scrapers 18 and 19. An idle apron roller 20 is journaled in bearings 21 adjustably secured to the casing and an endless apron 22 carried by the apron roller 8 travels thereover and under the small guide roller 23, and also under the apron guide board 24 which is secured between the walls of the casing.

A yoke 25 located on the outside of the casing is pivotally mounted on the extended ends of shaft 26 of roller 6, its front portion extending across the front end of the casing and provided with a projecting arm 27 whereon a weight 30 is adjustable. The legs 28 of the yoke form bearings for the respective ends of a shaft 29 which is extended through slots 31 formed in the side walls of the casing and carries a forming roller 32. A sprocket wheel 33 on shaft 29 is driven by a chain 34 from a wheel 35 on shaft 26 for rotating roller 32 at the same peripheral speed as that of rollers 6, 7, 8 and 9. Branch arms 36 extended from the yoke 25 near its pivotal connections with shaft 26 carry the respective ends of shaft 37 which is movable in slots 38 formed in the side walls of the casing, and whereon an idle tripping roller 39 is mounted within the casing.

A curved loaf guide 41 formed with ears 42 which are movable in vertical slots 43 formed in the opposite walls of the casing is vertically adjustable within the casing by means of adjusting screws 44. A mold board 45 removably secured at its rear end to the guide 41 by a pin 40 or other suitable means forms a forward continuation thereof a short distance below the endless apron 22 and is adjustably supported near its front end on screws 46. Said mold board may be transversely concaved on its upper surface, as shown in Fig. 3, for forming oval shaped loaves 50 (as shown by dotted lines) or a number of mold boards with different surface patterns may be used interchangeably to form loaves of different shapes as desired.

In operation, the proper quantity of dough for a loaf is placed in the hopper and moves the idle tripping roller 39 in a forward direction in its passage thereunder.

It thence passes between and is rolled into a thick sheet by the feeding rollers 6 and 7, which sheet is continued and rolled thinner between rollers 7 and 9. As the sheet of dough is being delivered on the apron from roller 9 it is carried thereby partly around roller 8 and in contact with the forming roller 32. The action of rollers 9, 8, and 32 serves to form the sheet of dough into a spiral roll as shown at 47 in Fig. 2. When the lump of dough for another loaf is placed in the hopper the tripping roller is again moved thereby in a forward direction and in an arc concentric with roller 6 whereby the yoke is oscillated on its pivot sufficiently to raise the forming roller 32 for the passage thereunder of the spiral roll 47. The action of the apron rolls the spiral roll 47 in a forward direction in contact with the curved guide and the mold board whereby it is formed into the desired shape and compactness and delivered in the curved apron 48 ready for removal to the oven. In this manner the lumps of dough successively delivered in the hopper move the tripping roll and actuate the yoke with the forming roll to deliver the spiral roll formed from the preceding lump into the passage 49 between the apron and the curved guide and mold board. The apron guide board 24 prevents the lifting of the endless apron during the passage of the spiral roll thereunder along the mold board. The thickness of the sheet of dough may be regulated as desired by the adjustment of roller 9 in relation to roller 7. The thinner said sheet of dough is made the more compact will be spiral roll made therefrom. The weight 30 may be adjusted on the arm 27 of the yoke for partially counterbalancing the weight of the tripping and forming rollers thereon as desired. The curved guide and the mold board may be adjusted by means of the adjusting screws to adapt the depth of passage 49 to spiral rolls of different size. The face of pressure roller 9 may be knurled or covered with canvas if desired.

Having thus described my invention what I claim as new, is:—

1. In a loaf forming machine, the combination of a feed roller, an apron roller, a pressure roller adjustable concentric therewith and in relation to the feed roller, a forming roller in gravity contact with the apron roller, and means for driving said rollers at substantially the same peripheral speed.

2. In a loaf forming machine, the combination of a casing provided with a hopper, a feed roller and an apron roller journaled therein, a gravity forming roller arranged to coöperate with the apron roller, means arranged for controlling the pressure thereof toward the apron roller, and means coöperating with the feed roller for automatically moving the forming roller from the apron roller.

3. A loaf forming machine comprising a casing, a yoke trunnioned thereon, a feed roller journaled in the casing, a tripping roller journaled on the yoke and arranged to coöperate therewith, a gravity forming roller journaled on the yoke, and a weight adjustable on the yoke for partially counter-balancing the weight of the forming roller.

4. A loaf forming machine comprising a driven endless apron, means for forming and delivering thereon a sheet of dough, a yoke trunnioned at a fixed point, a gravity forming roller journaled thereon and coöperating with the apron, and a weight adjustable on the yoke for partially counterbalancing the forming roller.

5. In a loaf forming machine, the combination of a tripping roller, a forming roller movable thereby, an apron roller, an endless apron carried thereby, a curved guide adjustable in relation to the apron roller, and a mold board adjustable in relation to the apron.

6. A loaf forming machine comprising a driven endless apron, a forming board provided with a curved guide and adjustable in relation thereto, a yoke pivotally supported at fixed points, a gravity forming roller carried thereon and coöperating with the apron, a weight for partially counterbalancing the yoke with the forming roll, and pressure rolls arranged to form and deliver a sheet of dough upon the apron.

In testimony whereof I affix my signature in the presence of two witnesses.

FRANK STREICH.

Witnesses:
 F. BENJAMIN,
 H. DE LOS HIGMAN.